(12) United States Patent
Walker et al.

(10) Patent No.: US 6,703,578 B2
(45) Date of Patent: Mar. 9, 2004

(54) EXOTHERMIC REACTIONS AND METHODS

(75) Inventors: Richard E. Walker, Cadiz, OH (US); Dean Moore, Strongsville, OH (US)

(73) Assignee: Erico International Corporation, Solon, OH (US)

( * ) Notice: Subject to any disclaimer, the term of this patent is extended or adjusted under 35 U.S.C. 154(b) by 0 days.

(21) Appl. No.: 10/361,234

(22) Filed: Feb. 10, 2003

(65) Prior Publication Data

US 2003/0150347 A1 Aug. 14, 2003

Related U.S. Application Data

(63) Continuation of application No. 08/846,285, filed on Apr. 30, 1997, now Pat. No. 6,553,911.

(51) Int. Cl.[7] .......................... B23K 10/00; F42C 19/12
(52) U.S. Cl. ............................ 219/121.45; 219/121.52; 219/121.46; 219/130.4; 102/202.5; 102/202.9; 102/202.6
(58) Field of Search ................. 219/121.36, 121.45, 219/121.59, 121.46, 121.52, 130.4; 102/202.7, 202, 202.5, 202.6, 202.8, 202.9, 275.11, 364; 266/167

(56) References Cited

U.S. PATENT DOCUMENTS

| | | |
|---|---|---|
| 1,695,089 A | 12/1928 | Deppeler |
| 2,391,242 A | 12/1945 | Hurrey |
| 2,569,956 A | 10/1951 | Schlitknecht |
| 2,831,760 A | 4/1958 | Rejdak |
| 2,870,498 A | 1/1959 | Rejdak |
| 2,972,951 A | 2/1961 | Stresau |
| 3,020,610 A | 2/1962 | Rejdak |
| 3,054,349 A | 9/1962 | Plumley |
| 3,099,813 A | 7/1963 | Anderson |
| 3,298,306 A | 1/1967 | Purdy |

(List continued on next page.)

FOREIGN PATENT DOCUMENTS

| | | |
|---|---|---|
| DE | 1279821 | 10/1968 |
| EP | 0 120 176 | 10/1984 |
| EP | 0 164 313 | 12/1985 |
| FR | 324534 | 7/1902 |
| GB | 28041 | 10/1905 |

OTHER PUBLICATIONS

"Electroplated wire and ribbon." by Sigmund Cohn Corp., Apr. 1985.
"Exothermic Connections" by ERICO, Inc., 1993, published in Cadweld News vol. II, No. 1.
"Cadweld Connections and Related Products Trade Net Price Book" by ERICO, Mar. 1, 996, pp. 6 and 7.
"ThermOweld Low Emmission Electrical Connections" by thermOweld, Mar. 1, 1996.
"General Discussion of Pyrofuze" by Pyrofuze Corp. affiliate of Sigmund Cohn Corp. (not dated).

(List continued on next page.)

*Primary Examiner*—Mark Paschall
(74) *Attorney, Agent, or Firm*—Renner, Otto, Boisselle & Sklar, LLP

(57) ABSTRACT

Exothermic reaction mixtures are electrically ignited with a low cost foil strip of two conductive strips separated by a layer of insulation. One or more holes are formed in the ignitor to create shaped spark plasma on one side and a venting plasma on the opposite side of the hole. The spark with low energy requirements is sufficient to ignite exothermic reactions for welding, casting and other uses. The ignitor may be part of reusable crucibles and molds, or expendable packages, containers, and molds, or smaller squibs for igniting larger charges. The ignitor may be immersed in or substantially adjacent the charge of exothermic material. The spark forming hole or holes is made and shaped by a punch in a simple and low cost manner. The ignitor eliminates the need for starting powders or materials and flint gun ignitors.

44 Claims, 3 Drawing Sheets

U.S. PATENT DOCUMENTS

| | | | |
|---|---|---|---|
| 3,669,022 A | 6/1972 | Dahn et al. | |
| 3,827,362 A | 8/1974 | Huggett | |
| 3,955,505 A | 5/1976 | Johnston | |
| 3,961,579 A | 6/1976 | Faber et al. | |
| 4,062,485 A | 12/1977 | Andersen | |
| 4,182,947 A | 1/1980 | Brower | |
| 4,216,721 A | 8/1980 | Marziano et al. | |
| 4,334,474 A | 6/1982 | Coltharp | |
| 4,422,381 A | * 12/1983 | Barrett | 102/202.2 |
| 4,424,086 A | 1/1984 | Christopher | |
| 4,471,697 A | 9/1984 | McCormick et al. | |
| 4,690,056 A | 9/1987 | Brede et al. | |
| H464 H | 5/1988 | Lee et al. | |
| 4,879,452 A | 11/1989 | Kovarik et al. | |
| 4,881,677 A | 11/1989 | Amos et al. | |
| 4,885,452 A | 12/1989 | Amos et al. | |
| 4,889,324 A | 12/1989 | Brosnan et al. | |
| 4,938,137 A | 7/1990 | Guay | |
| 4,976,200 A | * 12/1990 | Benson et al. | 102/202.7 |
| 5,052,301 A | 10/1991 | Walker | |
| 5,090,322 A | 2/1992 | Allford | |
| 5,145,106 A | 9/1992 | Moore et al. | |
| 5,153,986 A | 10/1992 | Brauer et al. | |
| 5,275,106 A | 1/1994 | Cutting et al. | |
| 5,479,860 A | 1/1996 | Ellis | |
| 5,538,795 A | 7/1996 | Barbee, Jr. et al. | |
| 6,467,415 B2 | * 10/2002 | Menzel et al. | 102/275.7 |

\* cited by examiner

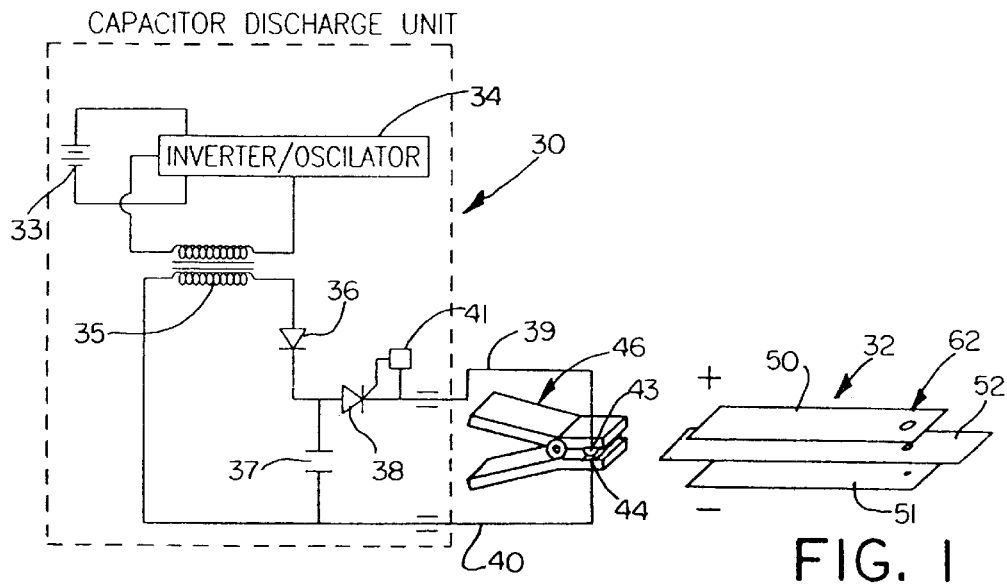
FIG. 1
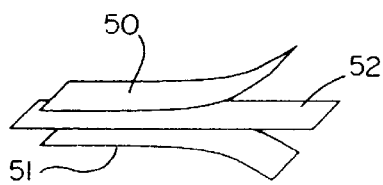
FIG. 2
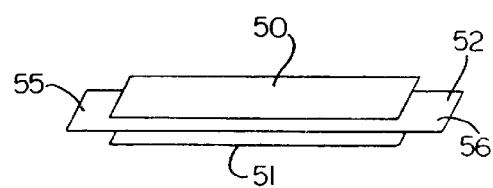
FIG. 3
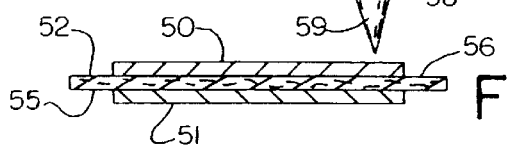
FIG. 4
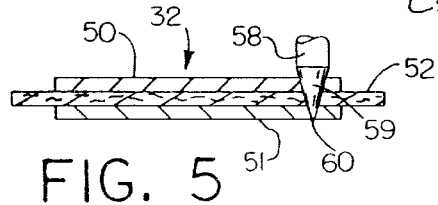
FIG. 5
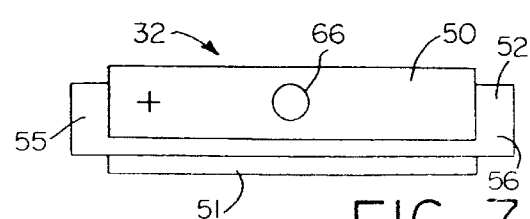
FIG. 6 / FIG. 7
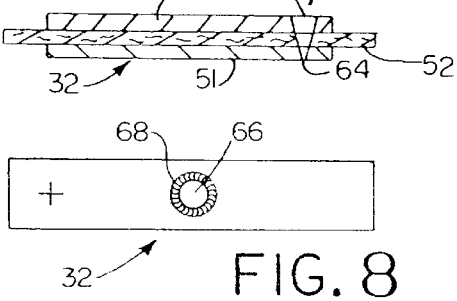
FIG. 8
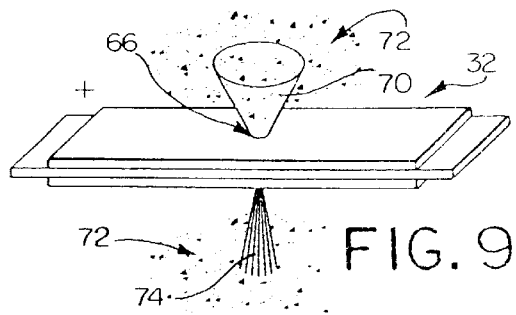
FIG. 9

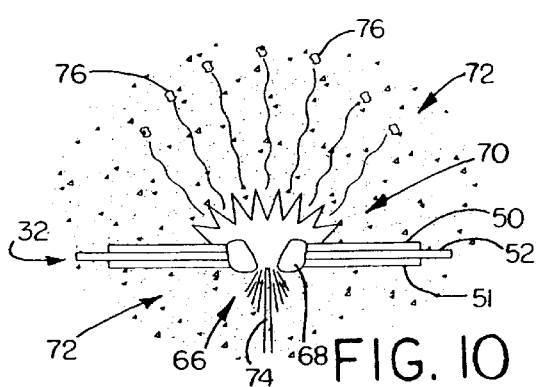
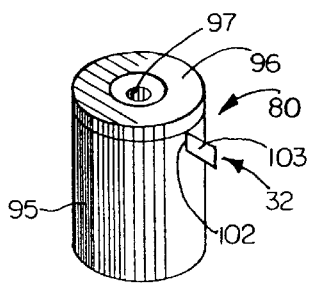
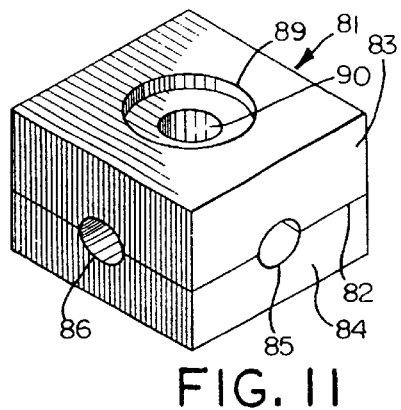
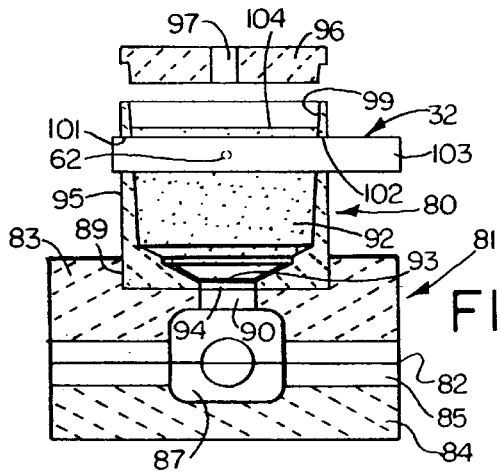
FIG. 10
FIG. 11
FIG. 12
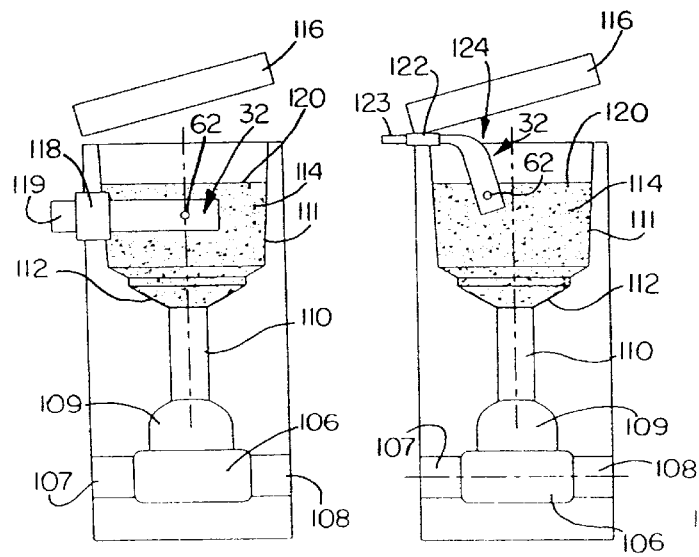
FIG. 13    FIG. 14    FIG. 15

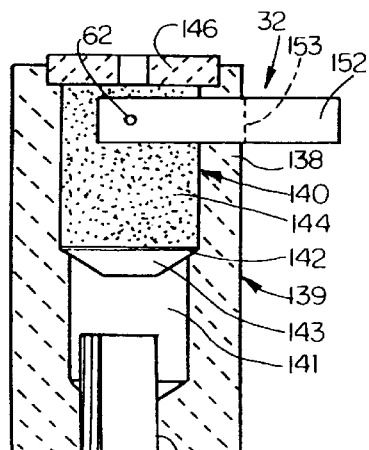
FIG. 16
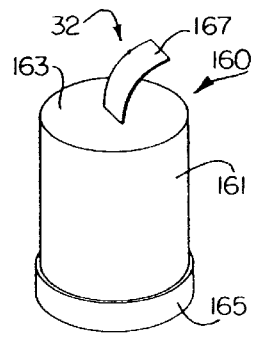
FIG. 17
FIG. 18
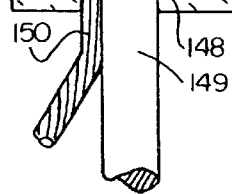
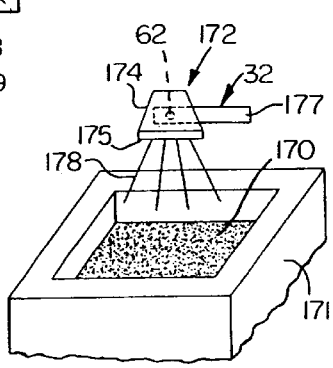
FIG. 19
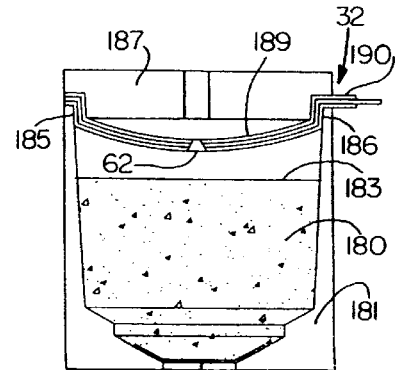
FIG. 20
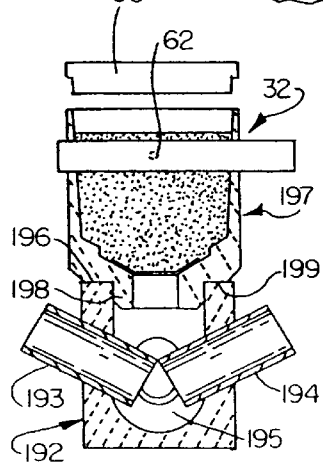
FIG. 21
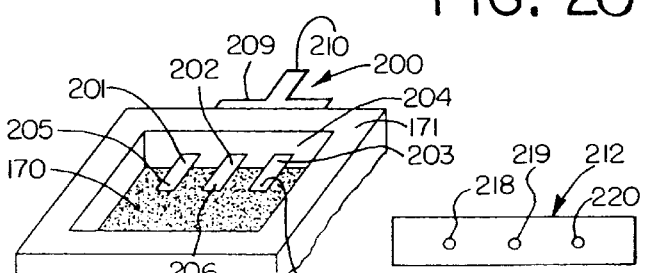
FIG. 22
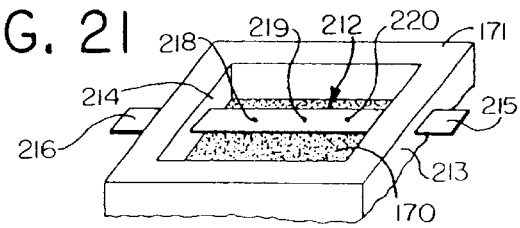
FIG. 23
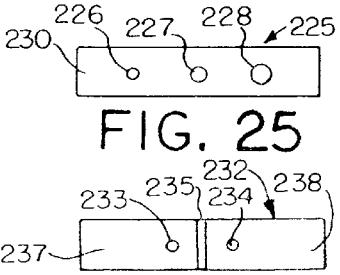
FIG. 24
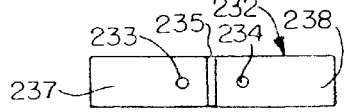
FIG. 25
FIG. 26

EXOTHERMIC REACTIONS AND METHODS

This is a continuation of U.S. application Ser. No. 08/846,285, filed Apr. 30, 1997, now U.S. Pat. No. 6,553, 911 which is incorporated herein by reference in its entirety.

DISCLOSURE

This invention relates generally to Exothermic Reactions and methods, and more particularly to apparatus and methods for initiating self propagating exothermic reactions.

BACKGROUND OF THE INVENTION

Examples of self propagating exothermic reactions are found in the CADWELD® process and the Thermit® process. CADWELD® is a trademark of Erico International, Inc., Solon, Ohio, U.S.A., and Thermit®) is a trademark of Th. Goldschmidt AG, Essex, Germany. Exothermic mixtures are basically a combination of a reductant metal and usually a transition metal oxide. An example is aluminum and copper oxide which upon ignition supplies enough heat to propagate and sustain a reaction within the mixture. It is usually the molten metal product or the heat of this reaction which is then used to produce a desired result. The CADWELD® process produces, for example, a mixture of molten copper and aluminum oxide or slag. The molten copper has a higher density than the slag and is usually directed by a mold to join or weld copper to copper or steel to steel. The aluminum oxide slag is removed from the weld or joint and discarded. Another common mixture is iron oxide and aluminum. Where only the heat of the reaction is used, the heat may be used to fuze brazing material, for example.

Mixtures of this type do not react spontaneously and need a method of initiating the reaction. This initiation method involves generating enough localized energy to enable the reaction to begin. Once the reaction has begun it becomes self sustaining and requires no further energy to proceed to completion. There are numerous combinations of reductant metals and transition metal oxides that can react exothermically. These reactions and the energy required to initiate these reactions vary greatly depending on the properties of the reactants and the localized conditions. Two common mixtures are combinations of copper oxide and aluminum, and iron oxide and aluminum. This invention is concerned with the initiation of exothermic reactions, and apparatus or packaging for utilizing such reactions.

Currently the most common way of making welds or joints with the CADWELD® process involves the use of split graphite molds. The conductors or items to be joined are thoroughly cleaned and then placed in the appropriate location to project into a weld chamber in the graphite mold. The molds may include a crucible above the weld chamber connected to the weld chamber by a tap hole.

The mold is then securely closed and locked usually with a toggle clamp, and a metal disk is positioned in the crucible over the tap hole. An appropriate amount of exothermic material is emptied into the crucible on top of the disk, and the traditional starting powder or material, which is essentially a much finer exothermic material, is sprinkled over the top of the welding material. The mold cover is then closed and the reaction initiated through the use of a flint ignitor.

The starting powder or material sprinkled on top of the exothermic material has a lower ignition temperature and is easily ignited by the flint gun while the flint gun cannot normally ignite the exothermic material directly. When the exothermic material is ignited, the molten metal phase separates from the slag and melts through the metal disk. The molten metal then is directed via the tap hole to the weld chamber and the conductors to be joined. Once the metal has solidified the mold is opened and the slag is separated from the weld joint. The mold is cleaned and readied for reuse for the next connection.

Because of the starting powder's low ignition temperature and deficiencies in handling and shipping, much effort has been made to find a reliable and low cost alternative ignition system for the exothermic material. A number of electrical systems have been devised which range from simple spark gaps to bridge wires or foils, to much more esoteric devices such as rocket ignitors. Such efforts pre seen, for example, in prior U.S. Pat. Nos. 4,881,677, 4,879,952, 4,885,452, 4,889,324 and 5,145,106. For a variety of reasons, but primarily because of power requirements, dependability, and cost, such devices have not succeeded in replacing the standard starting powder/flint gun form of initiating the self propagating exothermic reactions.

The packaging of the system is also important. Many such applications are performed outdoors or in the field, and portability and ease of use is important. For example, no one wants to carry around a car battery to use as an ignition system. Also, the system should be capable of use with few light weight, easily used and cleaned or preferably disposable components.

An ignition system for such materials should be able to produce about thirty (30) joules of energy. The system should require no special shipment classification or labeling which is now required in some jurisdictions with certain starting powders or materials. The system components should be user friendly to the point of being easily carried and operable with only one hand. The system should be readily transportable to difficult working ares or confined or cramped spaces. The system components should weigh less than 1.5 kgs or about the weight of a partially full attache case. As important, the ignition must be reliable and repeatable without requiring frequent new batteries or a frequent recharge, and must be economic to make and use.

It would also be advantageous if the ignition system did not use wires or projecting wires to which a power source needs to be connected. Power may be connected to such wires by allegator clips, for example, one for each wire. The wires tend to get bent, dislodge, catch on things, or broken off and may easily short. Many times lack of reliability is simply a faulty clip or clip connection, and this usually requires some probing or testing or repositioning of the clips or wires before the problem is even located. It would be desirable if no wires were used and a proper connection could be made with a single clip.

SUMMARY OF THE INVENTION

The exothermic materials reaction initiation system includes a power source for producing a voltage spike or surge and an ignitor comprising two strips of metal foil separated by a layer of insulation. The ignitor includes one or more strategically shaped and placed distortions in the form of one or more punched holes. It has been discovered that a relatively low voltage spike applied to the foil strips will create a spark plasma of sufficient shape and projection to ignite substantially adjacent exothermic mixture and have the reaction propagate to completion. The hole is formed by a small conical tip punch. The conical tip shapes the hole like a horn and the through opening at the small end of the horn acts as a vent.

The power source may be a battery powered capacitor discharge unit which will create the voltage to be delivered to the metal foil strips by two electrodes forming the opposite gripping surfaces of a spring clothespin type clip which is simply clamped on a projecting end of the metal foil strip with one foil strip in contact with one electrode. This maintains the required polarization. The battery or batteries may be relatively small, easily replaced, and rechargeable. The capacitor discharge unit need only create a voltage for about thirty (30) joules for most applications, and this is sufficient to create the shaped and vented spark plasma at the disruption or hole.

The ignitor unit is preferably thin strips of conductive foil which are separated by a thin layer of paper insulation adhered to the foil with thin layers of adhesive so that the layers do not readily separate and no air gaps or bubbles occur. Preferably the insulation extends beyond the foil, particularly at the ends so that no spark-overs occur at the edges or at a location other than at the strategically positioned disruption. The adhesive may be conductive to enhance current flow through the metal foil. The entire assembly including the conductive foil, the adhesive and the insulation may be only a few mils in thickness, and the strip assembly may be bent, folded or even twisted to some degree without damage to its integrity and purpose.

The selection of the metal or type of foil depends to some degree on the application. Since the shaped and vented plasma creating spark discharge at the disruption involves some controlled metal splatter and fusion of the foil, and since the ignitor in some applications will be consumed or partially consumed by the reaction, it is important that the metal of the foil be compatible with the reaction. Thus for copper welding, copper would be a suitable foil material. The paper and adhesive are also selected so as not to contaminate the exothermic process.

Although the ignitor assembly has many applications in connection with reusable crucibles and molds designed to contain and direct the reaction and the products of the reaction, a preferred form is built into a self contained and expendable package of exothermic material. The package may be positioned on a reusable or expendable mold, and the ignitor assembly may be unfolded or bent to extend or project from the package. The ignitor is connected to the power source, and the reaction initiated. A disk in the bottom of the package is fused by the reaction, and the molten metal formed runs into a reusable or expendable mold. The power source is then disconnected and the package discarded when cooled.

In some embodiments, the ignitor may include two or more holes or spark plasma creating disruptions. If the holes are of the same size, they will fire essentially concurrently. Such ignitors may be used for large volumes of exothermic materials to obtain multiple point ignition. If the holes vary in size, sequential ignition can be obtained. Multiple hole ignitors may also be used for larger charges or redundancy.

In addition to the ignitor and methods of making the ignitor, the invention also relates to the methods of ignition disclosed, as well as the applications and packages for utilizing the ignitor, all of which economically eliminate the use of the starting powder and materials, and the flint gun ignitor.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 is a schematic illustration of the power source and ignitor assembly;

FIG. 2 is a schematic illustration of the metal foil strips of the ignitor being assembled with the insulation therebetween;

FIG. 3 is a schematic illustration of the ignitor assembled but prior to the punching and shaping of the hole;

FIG. 4 is a schematic edge elevation illustration showing the conical tip punch about to enter the ignitor;

FIG. 5 is a similar schematic illustration showing the punch forming the hole;

FIG. 6 is a similar schematic illustration showing the shaped hole formed;

FIG. 7 is a schematic illustration of an ignitor with the hole more centrally positioned;

FIG. 8 is a schematic illustration of the fusion which takes place around the hole in an intermediate phase of the ignition;

FIG. 9 is a schematic illustration of the spark plasma energy created showing the conical shape of the energy plasma on one side and the venting plasma on the other;

FIG. 10 is another somewhat larger view showing the shape of the spark plasma, the venting plasma and the fusion taking place, all immersed in an exothermic reaction mixture;

FIG. 11 is an exploded view of the ignitor assembly of the present invention extending diametrically through a disposable container or crucible to be positioned on a reusable mold;

FIG. 12 is a section through the assembly of FIG. 11;

FIG. 13 is a view of the ignitor extending through the wall of a reusable mold and crucible;

FIG. 14 illustrates the ignitor positioned beneath a hinged lid of a reusable mold and crucible;

FIG. 15 illustrates the ignitor positioned between a lid of the type used with one or more fume and particle collecting filters;

FIG. 16 illustrates the ignitor used with a disposable mold and crucible;

FIG. 17 is a perspective view of a squib-like container of exothermic material with the ignitor extending through the end;

FIG. 18 is a diametric section of the container of FIG. 17;

FIG. 19 is an illustration of a smaller shaped squib being used to ignite a larger reaction;

FIG. 20 is a view of an expendable package but with the ignitor not immersed in the exothermic material but being generally parallel to the top or lid and the spark plasma generating hole being substantially adjacent the top surface of the material;

FIG. 21 is a sectional view of another type of expendable package used with another type of disposable mold;

FIG. 22 is an illustration of a large crucible with three ignitors positioned above and substantially adjacent the top surface of the exothermic material;

FIG. 23 is an illustration like FIG. 22 but showing a single ignitor with plural holes;

FIG. 24 is a schematic illustration of a plural hole ingitor with holes of common size;

FIG. 25 is a similar schematic illustration of a plural hole ignitor with holes of ascending size; and FIG. 26 is a schematic illustration of another form of ignitor which may also be used where redundancy is desired.

DETAILED DESCRIPTION OF THE PREFERRED EMBODIMENTS

Referring initially to FIG. 1, there is illustrated generally at 30 a capacitor discharge unit for creating the voltage/joule surge or spike for firing the ignitor assembly 32 for the exothermic material. The capacitor discharge unit 30 includes one or more batteries 33 connected to an inverter or oscillator 34 which converts the DC current of the batteries to a high frequency AC current. The output of the inverter then passes through a step-up transformer 35 which steps-up the voltage. The higher voltage AC current is then passed through a rectifier 36 which may be full wave or half wave to convert the AC current back to DC current. The DC current then charges the capacitor 37. When a switch 38 is closed, a voltage surge or spike is created between the leads 39 and 40. The switch 38 may be a mechanical or solid state switch, and if the latter, the switch may closed by gate firing circuit 41. The leads 39 and 40 shown schematically are connected to half-round projecting electrodes 43 and 44, respectively, extending transversely on the interior of the jaws of a spring-loaded clothespin or alligator clip shown generally at 46.

Referring now additionally to FIGS. 2–6, it will be seen that the ignitor assembly 32 comprises two conductive metal foil strips 50 and 51 separated by a layer of insulation 52. The method of making the ignitor is sequentially illustrated in FIGS. 2–5. Since the ignitor is normally going to be consumed in the exothermic reaction, it is important to select materials for the ignitor which are compatible with the exothermic reaction materials. In the CADWELD process where copper conductors are being welded, the preferred metal foil material is copper. The preferred insulating material may be paper, and the entire thickness of the assembly may be only a few mils. It will be appreciate, however, that for other applications other metals or conductive foils may be employed together with other insulating strips.

Thin layer of paper insulation serves two purposes. It provides an insulating barrier between the two strips of copper foil and also provides a deflective barrier for both heat and energy once the ignitor is fired or the reaction initiated. The outer foil layers 50 and 51 are joined to the intermediate insulating layer of thin paper by a minimal amount of conductive adhesive which may be placed on the interior of the copper foil strips. The adhesive enables the copper strips to be firmly attached to the paper while eliminating air gaps, and the conductive nature of the adhesive enhances current flow lengthwise of the metal foil strip. The foil layers and the insulation may be passed through the nip of rolls, for example, to ensure the proper adhesion and elimination of air gaps as seen in FIG. 2. When the layers of the ignitor are assembled as seen in FIG. 3, the insulation 52 preferably projects slightly beyond the ends of the foil strips, such projections being shown at 55 and 56. The projections are shown somewhat exaggerated in the schematic illustrations and may be only a small fraction of an inch or a few millimeters.

Once the ignitor is assembled as seen in FIG. 3, a disruption is formed in the ignitor to provide a source of energy discharge. This disruption is in the form of a conical hole which is formed by punch 58 having a relatively sharp conical tip 59.

As seen in FIG. 5, the punch enters the strip and the tip 59 projects through the strip assembly to project slightly from the other side as seen at 60. As seen in FIG. 6, when the punch is withdrawn, there is formed a hole 62 in the strip ignitor which has the conical configuration of the punch. The hole on one side has a large end 63 and on the other side has a small or vent end 64. The hole passes completely through the strip assembly, and the hole formed is shaped like a horn flaring to the large end 63.

The hole may be located at any desired point along the strip, and in the form seen in FIG. 6 is located at one end. In FIGS. 7, 8 and 9, the hole shown at 66 is located in the center of the strip end-to-end and midway between the lateral or side edges. Also, as hereinafter described, more than one hole may be employed, and the size of the hole may vary. The hole illustrated is not to scale, and the diameter of the large end of the hole may vary from a fraction of a millimeter to about 2 millimeters. The cone angle may also vary from that illustrated to obtain the conical or horn configuration which provides a shaped spark plasma. Being a punched perforation, the hole has characteristics of punching which distorts the linear nature of the assembly providing slightly folded or jagged edges and an attenuated insulation at the hole.

When the reaction is to be initiated and the ignitor strip assembly 32 fired, it is connected to the capacitor discharge unit 34 simply by clamping the clip 46 on the projecting end of the ignitor assembly. Upon release of the capacitor energy, the initiation of the exothermic reaction occurs within milliseconds. Although the precise mechanics of the phenomena are not known, it is believed that the phenomena may be expressed by the following sequence of events, and as particularly illustrated in FIGS. 7, 8, 9 and 10.

In the ignition sequence, the energy is released from the capacitor and into the two copper strips 50 and 51, each receiving one pole of the discharge, i.e. one negative and one positive.

The conical hole 66 through the foil and paper strip assembly acts as a disruption or a point of resistance and begins to heat rapidly; so rapidly, that there is essentially no time for the heat to dissipate to the surrounding materials. Eventually enough heat is available to cause a rapid melting of the entire thin 360° edge of the foil at the edge of the conical hole. This occurs according to $I^2R$ where I is the current push and R is the resistance. The molten edge in the intermediate phase as seen at 68 in FIGS. 8 and 10 increases the resistance thereby increasing the speed of further heating. The melting of the copper occurs at 1083° C.

The phenomena occurs in such a short time that the molten phase is unable to move, and the continued heating forces the molten copper to vaporize. This occurs for copper at in excess of 2571° C. The gas phase increases the resistance in the localized area even further.

The vapor begins to expand but continues to draw current until it begins to draw an electric arc. The arc or spark plasma may obtain temperatures in excess of 5000° C. The electric arc-or spark forces the gas phase to a point of ionization which will begin to reduce the resistance very quickly which further increases the amount of current moving into the area.

The increase in current to the vapor region produces increased heating or super heat to the expanding vapor which forces the vapors to expand rapidly producing a resultant shock wave of spark plasma which is shown schematically as the top cone 70 in FIGS. 9 and 10. In such Figures, the ignitor is immersed in exothermic material which may be in the granular form illustrated at 72 on both sides of the ignitor. The conical shock wave, however, expands with reduced force due to the presence of the smaller or vent hole in the other or opposite side of the ignitor. This vent or smaller end of the hole produces a somewhat smaller spark plasma seen at 74 reducing the extent and force of the shock wave cone 70 thus reducing the disturbance of any surrounding or close-by exothermic material 72 prior to the initiation of the reaction. A force too extensive and too sudden may literally remove or blow away some types of exothermic material from the heat of the spark plasma.

The shock wave carries molten copper such as seen at 76 in FIG. 10 from the molten circumference 68 of the conical hole. The molten copper 76 spreads outwardly from the circumference of the conical hole while the vent hole provides the spark plasma 74 and the energy transfer in the opposite direction. The combination of the super heated vapor, the molten copper release in the shock wave, and the drawing of the electrical arc provide a substantial broadcast of energy and a multi-point ignition of the exothermic material 72.

Referring now to FIGS. 11 and 12 there is illustrated a utilization of the ignitor of the present invention in exothermic welding apparatus such as the CADWELD process for welding bar or cable to each other, for example. The apparatus illustrated in FIGS. 11 and 12 comprises an expendable crucible or container 80 and a two part reusable mold shown generally at 81. The mold assembly 81 is horizontally split as seen at 82 into upper and lower mold parts 83 and 84 made of a refractory material such as graphite. The parting faces have recesses which form sleeving passages 85 and 86 which lead to an enlarged weld chamber 87. The mold assembly parts may be clamped together at the parting plane and opened by a suitable toggle clamp assembly, not shown.

The upper mold part 83 is provided with a recessed seat 89 axially aligned with a smaller and vertical tap hole 90 which communicates with the weld chamber 87. The sleeving passages are adapted to receive cable or rod ends, which project into the welding chamber and which are to be welded together by the apparatus and process illustrated.

The expendable package 80 includes a correct amount of exothermic material seen at 92 in FIG. 12. That exothermic material is supported on a metal disk 93 which closes hole 94 in the bottom of the package, and which hole is aligned with the tap hole 70 when the package is assembled with the mold. The expendable package is in the form of a refractory cylindrical container 95 and a lid or top 96 having a central vent hole 97. The interior of the package provides a crucible chamber 99 which terminates in conical seats at the bottom, the lowermost of which supports the metal disk 93.

Extending diametrically through the top of the generally cylindrical package or container is an ignitor assembly strip 32 which includes the shaped hole 62 in the upper center of the exothermic charge 92. The ignitor assembly extends through vertical slits 101 and 102 in the wall of the package, and the end 103 projects substantially beyond the outside of the package. The upper level of the exothermic charge seen at 104 is above the ignitor strip 32 so that the hole 62 is immersed in the upper portion of the exothermic material. The expendable package 80 of FIGS. 11 and 12 contains the precise amount of exothermic material, and the components of the package may be formed from a variety of refractory materials such as a fired ceramic, molded sand, or glass, for example. The package after use is disposable. The container may be formed with the ignitor assembly in place, filled with the requisite amount of exothermic material and then closed by the lid 96 to form the completed package. The extended end 103 of the ignitor may simply be folded flat against the wall of the package and the entire assembly wrapped.

When in use, the package is simply unwrapped and placed in the seat 89, and the ignitor end 103 caused to project radially as shown. The clip 46 of FIG. 1 is then attached to the projecting end 103. When the exothermic reaction is initiated, it will start at the top of the charge of the material and move downwardly fusing the disk 93 to permit the molten metal formed to run into the weld metal chamber 87 welding the end of the cables or rods together. Any slag formed by the reaction rises to the top and may be removed from the weld. When the package cools, the package is simply discarded, and the mold parts 83 and 84 are opened for removal of the welded cable or rods. The mold parts are cleaned for reuse with another disposable package.

In the embodiment of FIG. 12, the ignitor extends diametrically completely through the charge of exothermic material and is immersed therein. There are, however, a number of ways in which the ignitor may be positioned with respect to the exothermic material contained in the crucible, whether it be a disposable package or a reusable mold.

Referring now to FIGS. 13 through 15 there is illustrated a number of ways in which the ignitor may be mounted with respect to the exothermic material contained in a crucible which forms part of a reusable mold. In FIGS. 13 through 15 the molds are vertically split, and each half of the mold contains the cavity and passage pattern illustrated in the form of generally semi-circular recesses. When the mold halves are clamped together, the complete mold assembly is formed. Each mold assembly includes a weld chamber 106, sleeving passages 107 and 108, a riser chamber 109 on top of the weld chamber, a tap hole 110 communicating with the bottom of crucible 111 and the riser or weld chamber, the latter including the conical seat at the bottom for the metal disk 112 closing the bottom of the crucible at the tap hole containing the charge of exothermic material 114. In FIGS. 13 and 14, the top of the assembly is provided with a hinged refractory lid 116.

In FIG. 13, the ignitor assembly shown generally at 32 extends through one wall only of the crucible chamber and through an insulator indicated at 118 which may be made of paper. The ignitor has a projecting end 119 extending from the exterior of the insulator and the hole or disruption 62 is below the level 120 of the exothermic material 114. The ignition hole is nonetheless in the top center portion of the charge of exothermic material.

In FIG. 14, the ignitor 32 extends through insulator 122 which may be paper on the rim of the crucible beneath the hinged lid 116. The ignitor assembly projects beyond the insulator as seen at 123 and is twisted at 124 so that the disruption or hole 62 is below the surface 120 of the exothermic material. In this embodiment, the ignitor assembly has at the projection as major horizontal plane rather than a vertical plane as seen in FIG. 13. The ingitor strip assembly is, however, twisted so that at the hole or disruption 62 the major plane extends vertically.

In the reusable mold of FIG. 15, a lid 128 telescopes over the assembly and supports one or more filters 129 adapted to contain any fumes or other unwanted byproducts of the exothermic reaction. The charge of exothermic material 114 may nonetheless be ignited by the ignitor 32 extending through an insulator 131 between the filter containing lid 128 and the top rim of the crucible. The insulator 131 is stepped to provide the zigzag configuration shown to fit between the mold and lid. The ignitor may readily be bent to fit through the insulator and includes the projecting horizontal portion 132 and a twisted section 133 inside the insulator which enables the inner end to project downwardly in a different plane so that the hole or disruption 62 is below the level 120 of the exothermic charge. Fume containing filter units are sold by Erico International Corporation of Solon, Ohio, under the registered trademark EXOLON® which enables exothermic welding to be performed in sensitive or clean environments.

In any event, the ignitor of the present invention may readily be adapted to extend through the walls of reusable molds or between the lids and rims of the crucibles, and the insulators or packings illustrated not only readily support the ignition assemblies either projecting through the wall as seen in FIG. 13, or to be twisted to project from the rim down into the exothermic material. In each instance, the ignition is obtained by simply fastening the clip 46 to the projecting ends 119, 123 or 132.

As illustrated in FIG. 16, the ignition assembly 32 projects through the wall 138 of a disposable or expendable mold 139. The mold body may be made of a refractory material such as a ceramic, a bonded sand, or glass, for example, and includes an interior upper crucible chamber 140 and a lower weld chamber 141 with a shoulder 142 between such chambers supporting a metal disk 143 containing a charge 144 of exothermic material in the crucible chamber. The expendable mold is provided with a lid 146. The bottom of the mold is provided with a keyhole sleeving passage 148. The passage may accommodate the top of a rod 149 and a cable 150 to be welded thereto.

The ignitor assembly may be installed in the expendable mold during the forming process, or it may be -inserted subsequently through a formed slit. The interior of the ignitor assembly has the hole or disruption 62 positioned centrally in the upper center section of the exothermic charge, and the outer end of the ignitor assembly projects radially as indicated at 152. For packaging and shipping, the ignitor may be folded or bent along the dotted line indicated at 153 to lie flush against the exterior of the wall of the mold. The ignitor may readily be bent without compromising its integrity. When the package is opened, the ignitor can simply be rebent to project in the manner illustrated. The package is positioned on the rod and cable, and the clip 46 is clamped to the projecting end of the ignitor assembly. The capacitor discharge unit when fired then ignites the exothermic material by causing the spark plasma ignition described above. The ignition of the exothermic material fuses the disk 143, and the molten metal formed drops into the weld cavity to weld the two parts together. After the weld, the mold may be left in place or simply knocked off with a hammer.

The ignitor of the present invention may also be used with what is commonly called a squib. Squibs are sometimes referred to as small charges of exothermic material which are in turn used to ignite larger charges. The squib may shower molten metal spray on the surface of the larger exothermic charge which is sufficient to initiate the main exothermic reaction. One such squib is shown in FIGS. 17 and 18 at 160.

The squib 16 comprises a disposable refractory cup-shaped container 161 which includes a cylindrical wall 162 and an end wall 163. The container contains a charge 164 of exothermic material, and the rim or open end of the cup is closed by a thin metal foil cap 165. The ignitor assembly 32 projects through the end wall 163, and the hole or disruption 62 is embedded in the charge of exothermic material. The free or connection end 167 simply projects axially from the container through the wall 163, and the clip 46 may readily be connected to the projecting end 167. When the exothermic material is ignited, it will quickly burn through the cap 165 spewing or broadcasting molten metal and other products or the reaction which may then in turn be used to ignite a larger charge of exothermic material.

In FIG. 19 there is a larger charge of exothermic material seen at 170 contained in larger crucible 171. A squib ignitor for such charge is shown generally at 172 and comprises a smaller charge of exothermic material in a shaped consumable container 174, the bottom of which is closed by a thin metal foil cap 175. The ignitor assembly 32 projects through the wall of the consumable container with the hole or disruption 62 being within the container. The projecting end 177 enables the capacitor discharge unit readily to be connected thereto with the clip 46. When ignited, the contents of the shaped squid fuses the cap 175 and literally showers the top surface of the main quantity of exothermic material 170 with a super heated molten metal shower as indicated at 178. This in turn ignites the larger quantity of exothermic material.

In FIG. 20 there is illustrated a charge of exothermic material indicated at 180 within an expendable crucible or container 181 supported on consumable disk 182. The upper level of the charge 180 is at 183. The ignitor assembly 32 for the exothermic material 180 is positioned principally in a horizontal plane and is folded in a zig-zag fashion seen at 185 and 186 to fit over the rim of the container and beneath the lid 187. The ignitor is thin enough to be folded in the manner indicated without compromising either the ignitor or the connection between the container and its lid. The central portion of the ignitor may be bowed slightly downwardly as seen at 189 to position the hole 62 slightly above the level 183 and in the center of the charge. It is noted that the large end of the hole 62 is directed downwardly and is closely above or substantially adjacent and almost contiguous with to the top level 183 of the exothermic charge. The ignitor end 190 projects beyond the container to enable the capacitor discharge unit to be connected thereto. The spark plasma characteristics of the spark plasma discharge are sufficient to ignite the exothermic material even though the hole or disruption is not immersed in the material.

In FIG. 21 there is illustrated a disposable refractory container 192 which includes inclined metal guide sleeves 193 and 194 projecting into a weld chamber 195. The sleeves enable cabling or rod of different sizes to be inserted for welding without regard to molten metal sealing. The top of the expendable mold includes an annular rim 196, and the expendable container 197 is positioned on such rim. The container 197 is generally similar to the container 80 seen in FIG. 12, but includes a bottom annular spout or nozzle 198 adapted to project into the top of the mold 192. An annular shoulder 199 surrounds the nozzle enabling the container 197 to be positioned on the mold as illustrated. Like the container 80, the ignitor assembly 32 extends diametrically through the wall of the container and the hole or disruption 62 is positioned within the charge of exothermic material at the upper center.

Referring now to FIG. 22 there is illustrated a large crucible 171 containing a large charge of exothermic material 170. The ignitor assembly shown generally at 200 includes three ignitor strip assemblies 201, 202 and 203 projecting through the wall 204 of the mold. The end of each assembly is provided with a hole or disruption as seen at 205, 206 and 207, respectively. The ignitor strip assemblies are interconnected by a bus section 209 which has a projecting stem 210 to which the capacitor discharge unit may be connected. The disruptions or holes may be positioned substantially adjacent the top surface of the material or may be immersed in the material. If on top of the material, the large ends of the holes are facing downwardly. In any event, the ignitor of FIG. 22 provides a multi-point substantially concurrent ignition for the larger charge of exothermic material.

In FIGS. 23 and 24 there is illustrated another multi-point ignitor assembly 212. The ignitor assembly 212 extends through opposite walls 213 and 214 of crucible 171 and projects from both as indicated at 215 and 216, respectively. The ignitor is provided with three holes or disruptions 218, 219 and 220, which are of the same size, and which are equally spaced from each other. In the embodiment of FIG. 23, the large end of the holes faces downwardly or towards the charge of exothermic material. The capacitor discharge unit attached to either projecting end of the ignitor assembly will provide three points substantially concurrent ignition for the exothermic charge 170.

With additional reference to FIG. 24, it will be seen that by strategically placing more than one hole on the ignitor body, and by making the holes all have substantially identical characteristics including shape and size, sufficient energy can be applied to insure that each hole or site acts as a shaped spark plasma charge firing essentially simultaneously. However, with multiple point ignition such as illustrated in FIGS. 23 and 24, higher levels of energy are required since each site or hole utilizes an equal fraction of the energy.

In FIG. 25 there is illustrated an ignitor assembly 225 having three different sites or holes 226, 227 and 228, which holes are not of the same size and characteristics. An ignitor such as seen in FIG. 25 may be utilized to provide a reliability factor. Thus, if the hole sizes and shapes differ, then the electrical resistance at each site or hole determines which site will draw the energy necessary for initiation. With the clip attached at the end 230, the smaller hole site would normally fire first. The other shape charges or sites on the ignitor will remain intact without any energy discharge occurring. Therefore, the ignitor acts normally as a single site ignitor. However, if the discharge fails to ignite the exothermic material such as by disturbing the material as indicated above, the site which has discharged is sufficiently destroyed, and any contact between the two copper foils is eliminated. This site then is not capable of discharging a second time. However, the remaining sites are still intact and capable of discharge. The recharging of the capacitor and releasing the current into the ignitor assembly a second time will result in another site on the same ignitor discharging. Once again, the amount of resistance at each site determines which site discharges next. The sequence can continue until the ignitor is sufficiently destroyed or the exothermic reaction is initiated.

With reference to FIG. 26, there is illustrated another form of ignitor assembly shown at 232 which includes two holes seen at 233 and 234. The holes 233 and 234 may have identical characteristics and shape. However, the foil layer facing the viewer is provided with a gap seen at 235. The clip 46 of the capacitor discharge unit may be positioned on either end 237 or 238 to obtain discharge at the hole site. If the discharge at one hole fails to ignite the exothermic material, the clip is simply placed on the other end of the strip assembly, and the capacitor discharge refired.

It can now be seen that there is provided a low cost foil strip ignitor assembly for exothermic material with wide application to exothermic welding, casting and other uses. The ignitor may be part of reusable crucibles and molds, or expendable packages, containers and molds, or used in smaller squibs for igniting larger charges. The ignitor may be immersed in or substantially adjacent a charge of exothermic material. The ignitor eliminates the need for starting powders or materials and flint gun ignitors.

To the accomplishment of the foregoing and related ends, the invention then comprises the features particularly pointed out in the claims, these being indicative, however, of but a few of the various ways in which the principles of the invention may be employed.

What is claimed is:

1. An ignitor comprising:
    a pair of conductive material layers; and
    an insulator layer;
    wherein the ignitor includes a perforation completely through the conductive material layers and the insulator layer; and
    wherein the insulator layer prevents direct electrical coupling between the conductive material layers as an ignition voltage is applied to the conductive material layers to initiate the ignitor.
2. The ignitor of claim 1, wherein the insulator layer is between the conductive material layers.
3. The ignitor of claim 1, wherein the perforation has a conical shape.
4. The ignitor of claim 1, wherein the conductive material layers are metal layers.
5. The ignitor of claim 4, wherein the metal layers include copper.
6. The ignitor of claim 4, wherein the metal layers are metal foil layers; and wherein the metal foil layers are adhered to the insulator layer by respective adhesive layers.
7. The ignitor of claim 6, wherein the adhesive layers are conductive adhesive layers.
8. The ignitor of claim 1, wherein the insulator layer includes paper.
9. The ignitor of claim 1, wherein the conductive material layers and the insulator layer have a combined thickness of at least 1 mil.
10. The ignitor of claim 1, wherein the ignitor includes an additional perforation completely through the conductive material layers and the insulator layer.
11. The ignitor of claim 10, wherein the perforations have substantially equal dimensions.
12. The ignitor of claim 10, wherein the perforations have unequal dimensions.
13. The ignitor of claim 1, wherein at least one of the conductive material layers contacts an edge of the perforation, through the insulator layer.
14. An ignitor comprising:
    a pair of conductive material layers; and
    an insulator layer;
    wherein the ignitor includes a perforation completely through the conductive material layers and the insulator layer;
    wherein the insulator layer prevents direct electrical coupling between the conductive material layers; and
    wherein the perforation includes a larger opening at one of the conductive material layers, and a smaller opening at the other of the conductive material layers.
15. The ignitor of claim 14,
    wherein the perforation includes an intermediate opening at the insulator layer,
    wherein the intermediate opening is larger than the smaller opening; and
    wherein the intermediate opening is smaller than the larger opening.
16. An ignitor comprising:
    a pair of conductive material layers; and
    an insulator layer;
    wherein the ignitor includes a perforation completely through the conductive material layers and the insulator layer;
    wherein the insulator layer prevents direct electrical coupling between the conductive material layers; and
    wherein the perforation creates an opening less than 2 mm in any direction.
17. An ignitor comprising:
    a pair of conductive material layers; and
    an insulator layer;
    wherein the ignitor includes a perforation completely through the conductive material layers and the insulator layer;
    wherein the insulator layer prevents direct electrical coupling between the conductive material layers; and
    wherein the perforation is a shaped perforation, thereby focusing materials expelled from the perforation primarily on one side of the ignitor.
18. The ignitor of claim 13, wherein the shaped perforation is also vented, thereby allowing some of the materials expelled from the perforation to be expelled on a side of ignitor that is opposite the one side of the ignitor.
19. An ignitor in combination with a capacitor discharge unit, the ignitor comprising:
    a pair of conductive material layers; and
    an insulator layer;
    wherein the ignitor includes a perforation completely through the conductive material layers and the insulator layer;
    wherein the insulator layer prevents direct electrical coupling between the conductive material layers; and
    wherein the ignitor, in combination with the capacitor discharge unit, produces a spark plasma from the perforation.
20. The combination of claim 19, wherein the spark plasma is produced on both sides of the ignitor.
21. The combination of claim 20, wherein the perforation is a shaped perforation, thereby focusing the spark plasma from the perforation primarily on one side of the ignitor.
22. The combination of claim 21, wherein the shaped perforation is also vented, thereby allowing some of the spark plasma from the perforation to be on a side of the ignitor that is opposite the one side of the ignitor.
23. The combination of claim 21, wherein the ignitor broadcasts the spark plasma and entrained molten material from the perforation.
24. The combination of claim 24, wherein the molten material includes material from at least one of the conductive material layers.
25. The combination of claim 19, further in combination with a charge of exothermic material, and wherein the perforation is adjacent the charge.
26. The combination of claim 25, wherein the exothermic material includes a weld metal material.
27. The combination of claim 26,
    wherein the perforation is a shaped perforation, thereby focusing the spark plasma from the perforation primarily on one side of the ignitor;

wherein the ignitor broadcasts the spark plasma and entrained molten material from the perforation; and wherein the weld metal material is ignitable by the entrained molten material.

28. The combination of claim 27, wherein the molten material includes material from at least one of the conductive material layers.

29. The combination of claim 27, wherein the entrained molten material ignites the weld metal material at multiple locations.

30. An ignitor in combination with a means to provide a voltage to the ignitor, the ignitor comprising;

a pair of conductive material layers; and an insulator layer;

wherein the ignitor includes a perforation completely through the conductive material layers and the insulator layer;

wherein the insulator layer prevents direct electrical coupling between the conductive material layers; and wherein the ignitor, in combination with the means to provide the voltage, produces a spark plasma from the perforation.

31. A method of igniting exothermic weld metal material, the method comprising;

forming a charge of the weld metal material;

placing a metal foil ignitor in ignition relationship with the charge;

impressing a voltage on the ignitor to cause:

melting of some of the metal foil along a distortion in the metal foil ignitor, thereby producing molten metal; and to cause broadcasting of at least some of the molten metal into the weld metal material, thereby igniting the charge of the weld metal material.

32. The method of claim 31, wherein the ignitor includes:

a pair of conductive material layers; and an insulator layer between the conductive material layers between the conductive material layers;

wherein the insulator layer prevents direct electrical coupling between the conductive material layers.

33. The method of claim 32, wherein the distortion includes a hole through at least one of the conductive material layers.

34. The method of claim 33, wherein the distortion is a shaped distortion configured to focus the broadcasting to primarily on one side of the ignitor.

35. The method of claim 34, herein the shaped distortion is also vented, thereby releasing pressure, during the broadcasting on a side of ignitor that is opposite the one side of the ignitor.

36. The method of claim 32, wherein the distortion includes a perforation completely through the conductive material layers and the insulator layer.

37. The method of claim 31, wherein the impressing the voltage causes electrical arcing between the conductive material layers at the distortion, resulting in heating that in turn causes the melting at the distortion.

38. The method of claim 31, wherein the broadcasting includes entraining the at least some of the molten metal in a shock wave emerging from the distortion.

39. The method of claim 38, wherein the shock wave is a spark plasma shock wave.

40. The method of claim 39, wherein the spark plasma shock wave is formed by the electrical arcing between the conductive material layers at the distortion.

41. The method of claim 40, wherein the ignitor includes:

a pair of conductive material layers; and an insulator layer between the conductive material layers between the conductive material layers;

wherein the insulator layer prevents direct electrical coupling between the conductive material layers.

42. The method of claim 41, wherein the distortion includes a perforation completely through the conductive material layers and the insulator layer.

43. The method of claim 42, wherein the perforation is a shaped perforation configured to focus the broadcasting to primarily on one side of the ignitor.

44. The method of claim 31, wherein impressing the voltage creates a voltage surge in a capacitor discharge unit that is coupled to the metal foil ignitor.

* * * * *